March 5, 1963  A. J. BJORK  3,080,268
LIGHTWEIGHT STRUCTURAL PANEL AND METHOD OF MAKING THE SAME
Filed Sept. 28, 1959
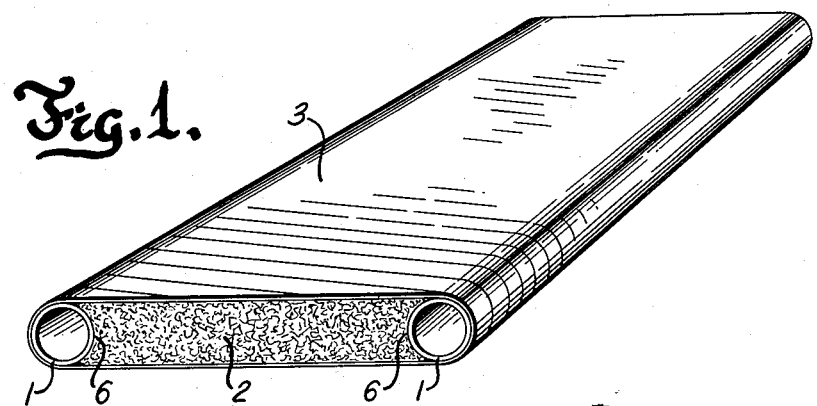
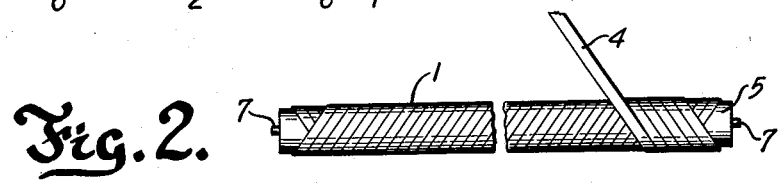
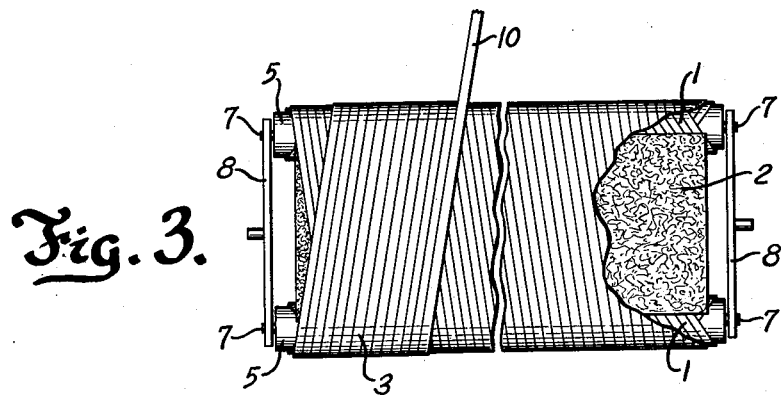
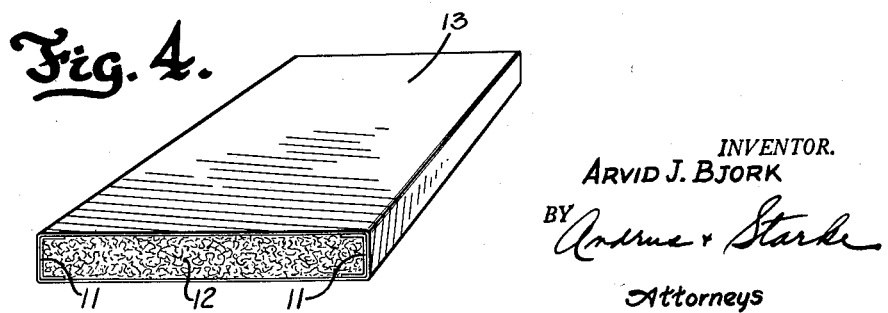
INVENTOR.
ARVID J. BJORK
BY *Andrus + Starke*
Attorneys

UNITED STATES PATENT OFFICE 3,080,268
Patented Mar. 5, 1963

3,080,268
LIGHTWEIGHT STRUCTURAL PANEL AND
METHOD OF MAKING THE SAME
Arvid J. Bjork, Wauwatosa, Wis., assignor to A. O. Smith Corporation, Milwaukee, Wis., a corporation of New York
Filed Sept. 28, 1959, Ser. No. 842,662
4 Claims. (Cl. 154—45)

This invention relates to a panel construction and more particularly to a method of forming a light weight structural panel by a fiber winding process.

Light weight structural panels are generally composed of a cellular core bordered by edging strips, and skins or facing sheets formed of metal or reinforced plastic are bonded to the core and edging strips. In the fabrication of a conventional panel, the core, edging strips and facing sheets are separately formed and are laminated or bonded together in presses or dies.

The present invention is directed to an improved panel construction which substantially increases the speed of fabrication and produces a stronger, more rigid panel. According to the invention, a pair of tubular members are initially formed by helically winding a strand of reinforcing material impregnated with a thermosetting resin about a mandrel in a series of superimposed layers. After winding the tubular members, the members are disposed in parallel spaced relation and a light weight core material is disposed edgewise between the tubular members. A fiber strand, impregnated with an uncured thermosetting resin, is then wound circumferentially about the tubular members and the core material to produce an integral structure.

The resin is subsequently cured by heating and the mandrels are then stripped from the tubular members and the resulting panel is trimmed to size.

The panel produced by this winding process has improved strength due to the rigidity provided by the tubular members at the edges of the panel. Furthermore, the core and tubular members are encased by substantially continuous fibers which are wound around the whole panel and provide added strength and rigidity for the entire unit.

As the panel is fabricated by winding processes, the speed of fabrication is substantially increased over that in which the separate panel elements are united in a laminating operation.

Other objects and advantages will appear in the course of the following description.

The drawings illustrate the best mode presently contemplated of carrying out the invention.

In the drawings:

FIGURE 1 is a perspective view of the completed panel of the invention;

FIG. 2 is a side elevation of a fibrous strip being wound on a mandrel to form a tubular support member;

FIG. 3 is a side elevation showing a fibrous strip being wound around the tubular support members and core to form the panel; and FIG. 4 is a modified form of the panel construction.

The drawings illustrate a light weight fiber reinforced panel comprising a pair of spaced, tubular hollow members 1, a light weight core 2 disposed between the members 1 and an outer sheath or casing 3 which surrounds the members 1 and core 2 to provide an integral structure.

The tubular members 1 are formed, as shown in FIG. 2, by winding a strand 4 of fibrous material impregnated with a thermosetting resin about a mandrel 5 in a generally helical pattern. The strand is wound in a series of superimposed layers with the strand in each layer having the opposite helix angle from the strand in adjacent layers.

The fiber strand 4 may consist of long, substantially continuous fibers in the form of tape or ribbon or may be interwoven fibers in the form of fabric or braided tubing. The strand 4 may take the form of haphazardly arranged fibers such as a strip of matting. The fibers themselves may be composed of ceramic materials, such as glass or asbestos; synthetic materials, such as nylon, Orlon, (a polymer of acrylonitrile), rayon; vegetable or animal materials; metallic wire and the like.

The thermosetting resin employed to bond the fibrous strands together may take the form of any of the conventional thermosetting resins, such as epoxide, polyester, urea, formaldehyde, melamine and the like.

After the tubular members 1 have been wound to the desired number of layers to provide the required physical properties, the members 1 are disposed in parallel spaced relation and the core 2 is interposed between the members. As best shown in FIGURE 1, the core is a generally flat member having arcuate recessed or concave edges 6 which complement the generally circular cross section of the tubular members 1.

The core 1 can be formed of any lightweight material such as foam plastic or the like.

After positioning the core 2, the ends 7 of the mandrels 5 are connected by suitable bars 8 to prevent displacement of the core 2.

A strand 10 or ribbon of fiber reinforcing material impregnated with resin is then wound about the members 1 and core 2 to provide the outer casing 3. The strand 10, as in the case of the strand 3, is wound with a generally helical pattern in a number of superimposed layers with the helix angle of each layer being opposite to that of adjacent layers.

The strand 10 is preferably formed of long, substantially continuous, unidirectional fibers and the fibers themselves are formed of a material similar to that of strand 3.

After the strand has been wound around the members 1 and core 2 with the desired number of layers, the composite unit is heated to cure the resin and provide a strong, integral structure. After curing, the bars 8 are removed and the mandrels 5 are stripped from the tubular members 1. The resulting panel is then trimmed along the side edges to provide a generally rectangular unit, as shown in FIGURE 1.

The panel, fabricated in accordance with the invention, is a strong, lightweight member which is particularly suitable for insulating applications. The tubular members 1 add rigidity and strength to the panel and the substantially continuous fibers 10 wound around the entire panel serve to increase the mechanical properties of the panel.

As the panel is fabricated by winding processes, the time of fabrication for the panel is substantially reduced over the ordinary laminating type of process.

FIG. 4 illustrates a modified form of the invention in which a pair of channel-shaped members 11 support a lightweight core 12 and an outer casing 13 of fibrous material surrounds the channel members and core to provide an integral unit.

The channel members 11 are formed in a manner similar to tubular members 1 by winding a fibrous strand impregnated with resin about a generally square or rectangular mandrel. After fabrication of the rectangular member, the member is removed from the mandrel and slit or cut longitudinally to provide the two channel members 11.

The core 12, corresponding in structure and function of the first embodiment, is then inserted within the open ends of the channel members 11 and a fibrous strand, corresponding to the fibrous strand 10 of the embodiment shown in FIGS. 1–3, is subsequently wound around the channel members and core to provide the integral structure.

In this embodiment, the channel members 11 correspond in function to the tubular members 1 of the first embodiment, and provide increased strength for the edges of the panel. The outer casing 13 is formed of long reinforcing fibers which extend around the channel members 11 and core 12, completely encloses the same and provide a unit of increased strength and rigidity.

Various modes of carrying out the invention are contemplated as being within the scope of the following claims particularly pointing out and distinctly claiming the subject matter which is regarded as the invention.

I claim:

1. A lightweight structural panel, comprising a pair of spaced generally parallel hollow members having a generally circular cross section, a cellular flat core disposed edgewise between the members and having opposite recessed edges to complement the contour of said members, a strand of substantially continuous unidirectional fibers disposed circumferentially around the members and core, and a cured thermosetting resin bonding the strand to the members and core to provide an integral structure.

2. A method of fabricating a panel, comprising winding a strip of fibrous material impregnated wtih a thermosetting resin circumferentially about a mandrel in a series of superimposed layers to provide a generally tubular member, disposing said tubular member in parallel spaced relation with a similar tubular member wound about another mandrel, disposing a generally flat lightweight cellular core between said tubular members with said core being disposed generally parallel to the axes of said members, winding a fibrous strand of reinforcing material impregnated with an uncured thermosetting resin circumferentially about the tubular members and said core to enclose said members and core, curing the resin to provide a hard rigid article, and removing the mandrels from the tubular members.

3. The method of claim 2 in which the fibrous strand is composed of substantially continuous unidirectional fibers and the core is composed of foam plastic.

4. A method of fabricating a panel, comprising winding a strip of fibrous material impregnated with a thermosetting resin about a generally cylindrical mandrel to provide a tubular member, disposing said tubular member in spaced parallel relation with a similar tubular member wound about another mandrel, providing opposite edges of a generally flat lightweight core with concave recesses, disposing the core edgewise between said members with the members being received within the recesses, connecting the ends of each mandrel to the corresponding ends of the other mandrel to prevent displacement of the core, winding a fibrous strand of reinforcing material impregnated with an uncured thermosetting resin circumferentially about the tubular members and said core to enclose said members and core, curing the resin to provide a hard rigid article, and removing the mandrels from the tubular members.

References Cited in the file of this patent

UNITED STATES PATENTS

| | | |
|---|---|---|
| 1,801,525 | Nelson | Apr. 21, 1931 |
| 1,852,813 | Mansur | Apr. 5, 1932 |
| 2,029,048 | Atwood | Jan. 28, 1936 |
| 2,339,121 | Van Cleef | Jan. 11, 1944 |
| 2,381,631 | Waring | Aug. 7, 1945 |
| 2,454,074 | Marc | Nov. 16, 1948 |
| 2,756,464 | Clements | July 31, 1956 |
| 2,862,650 | Scott et al. | Dec. 2, 1958 |
| 2,880,473 | Shwayder | Apr. 7, 1959 |
| 3,020,183 | Calvaresi | Feb. 6, 1962 |

FOREIGN PATENTS

| | | |
|---|---|---|
| 1,009,378 | France | May 5, 1952 |